United States Patent
Yasuda

(10) Patent No.: US 9,794,068 B2
(45) Date of Patent: Oct. 17, 2017

(54) CRYPTOGRAPHIC PROCESSING DEVICE AND CRYPTOGRAPHIC PROCESSING METHOD

(71) Applicant: FUJITSU LIMITED, Kawasaki-shi, Kanagawa (JP)

(72) Inventor: Masaya Yasuda, Kawasaki (JP)

(73) Assignee: FUJITSU LIMITED, Kawasaki (JP)

( * ) Notice: Subject to any disclaimer, the term of this patent is extended or adjusted under 35 U.S.C. 154(b) by 140 days.

(21) Appl. No.: 14/869,470

(22) Filed: Sep. 29, 2015

(65) Prior Publication Data
US 2016/0197726 A1 Jul. 7, 2016

(30) Foreign Application Priority Data
Dec. 16, 2014 (JP) ................. 2014-254548

(51) Int. Cl.
*H04L 1/00* (2006.01)
*H04L 9/28* (2006.01)
(Continued)

(52) U.S. Cl.
CPC ............ *H04L 9/3093* (2013.01); *H04L 9/008* (2013.01); *H04L 9/14* (2013.01); *H04L 2209/24* (2013.01)

(58) Field of Classification Search
CPC ......... H04L 9/3093; H04L 9/008; H04L 9/14; H04L 2209/24
(Continued)

(56) References Cited

U.S. PATENT DOCUMENTS 6,219,682 B1    4/2001   Terashima et al.
8,925,075 B2*  12/2014   Krendelev .............. H04L 9/008
                                                      380/28
(Continued)

FOREIGN PATENT DOCUMENTS

EP    2940921 A1   11/2015
JP    11-085300    3/1999
(Continued)

OTHER PUBLICATIONS

Extended European Search Report dated May 12, 2016 for corresponding European Patent Application No. 15187868.3, 7 pages.
(Continued)

*Primary Examiner* — Saleh Najjar
*Assistant Examiner* — Feliciano Mejia
(74) *Attorney, Agent, or Firm* — Fujitsu Patent Center

(57) ABSTRACT

A memory stores therein a first vector. A processor generates a first encrypted polynomial by encrypting a first polynomial that corresponds to a first binary vector obtained by performing a binary transformation on elements of the first vector. A transmitter transmits to a cryptographic operation device cryptographic information that represents the first encrypted polynomial. The cryptographic operation device multiplies the first encrypted polynomial by a second encrypted polynomial that is generated by encrypting a second polynomial that corresponds to a second binary vector obtained by performing a binary transformation on elements of a second vector, so as to generate a third encrypted polynomial. When assigning 2 to a variable in a prescribed portion of a third polynomial obtained by decrypting the third encrypted polynomial, a result of an operation of the first vector and the second vector is obtained.

9 Claims, 5 Drawing Sheets

(51) Int. Cl.
*H04L 9/30* (2006.01)
*H04L 9/00* (2006.01)
*H04L 9/14* (2006.01)

(58) Field of Classification Search
USPC .......................................................... 380/28
See application file for complete search history.

(56) References Cited

U.S. PATENT DOCUMENTS

| 9,413,729 | B2* | 8/2016 | Komano | H04L 9/0816 |
| 9,436,835 | B1* | 9/2016 | Saldamli | G06F 21/602 |
| 2006/0245587 | A1* | 11/2006 | Pinkas | H04L 9/085 380/28 |
| 2007/0110232 | A1* | 5/2007 | Akiyama | H04L 9/3026 380/30 |
| 2012/0219212 | A1 | 8/2012 | Anbai et al. | |
| 2014/0185794 | A1 | 7/2014 | Yasuda et al. | |

FOREIGN PATENT DOCUMENTS

| JP | 2012-181566 | 9/2012 |
| JP | 2014-126865 | 7/2014 |

OTHER PUBLICATIONS

Yasuda, Masaya et al., "Privacy-Preserving Wildcards Pattern Matching Using Symmetric Somewhat Homomorphic Encryption", In: "Lecture Notes in Computer Science", Jan. 1, 2014, vol. 8544, pp. 338-353, XP055212058.

Vergnaud, Damien et al., "Efficient and Secure Generalized Pattern Matching via Fast Fourier Transform", Jul. 5, 2011, Progress in Cryptology Africacrypt 2011, pp. 41-58, XP047025389.

Cardinaux, Fabien et al., "User Authentication via Adapted Statistical Models of Face Images", IEEE Transactions on Signal Processing, vol. 54, No. 1, Jan. 1, 2005, pp. 361-373, XP001238148.

Craig Gentry, "Fully Homomorphic Encryption Using Ideal Lattices", STOC 2009, May 31,-Jun. 2, 2009, pp. 169-178 (10 pages).

Kristin Lauter, et al.; "Can Homomorphic Encryption be Practical?", CCSW 2011, Oct. 21, 2011, pp. 113-124 (12 pages).

\* cited by examiner

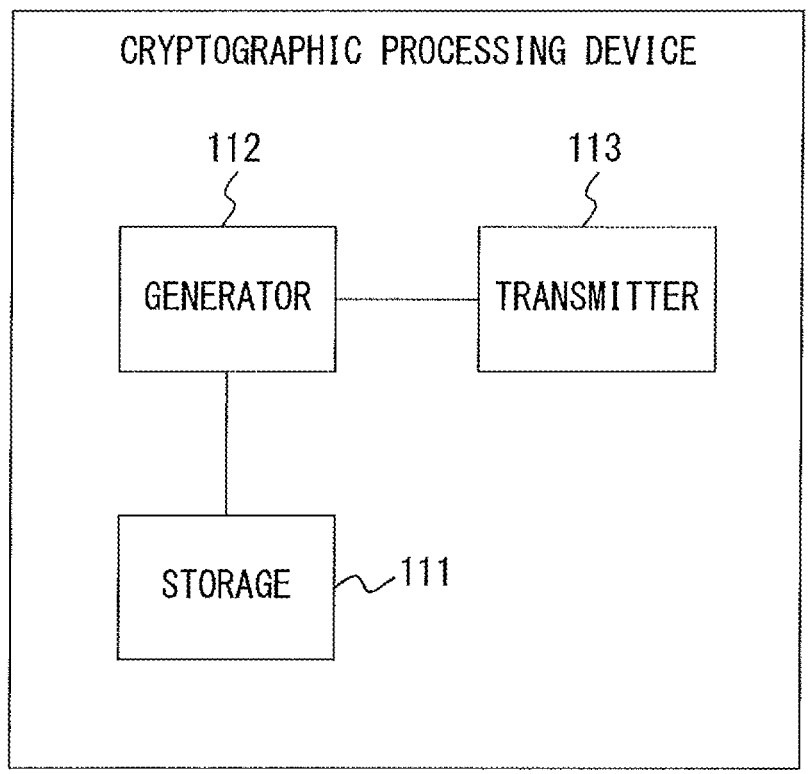
F I G. 1

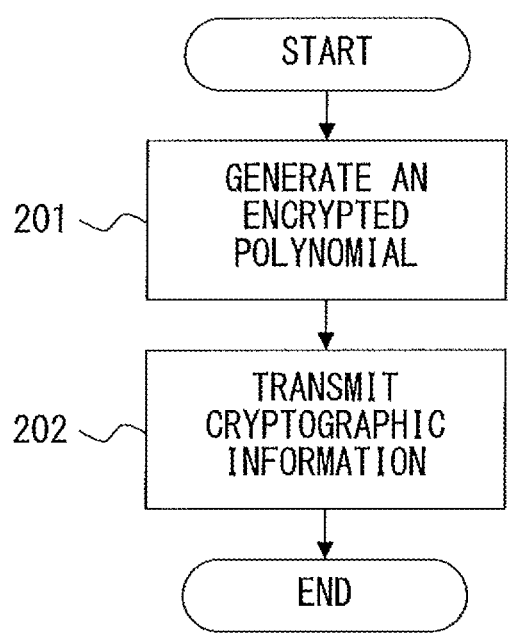
F I G. 2

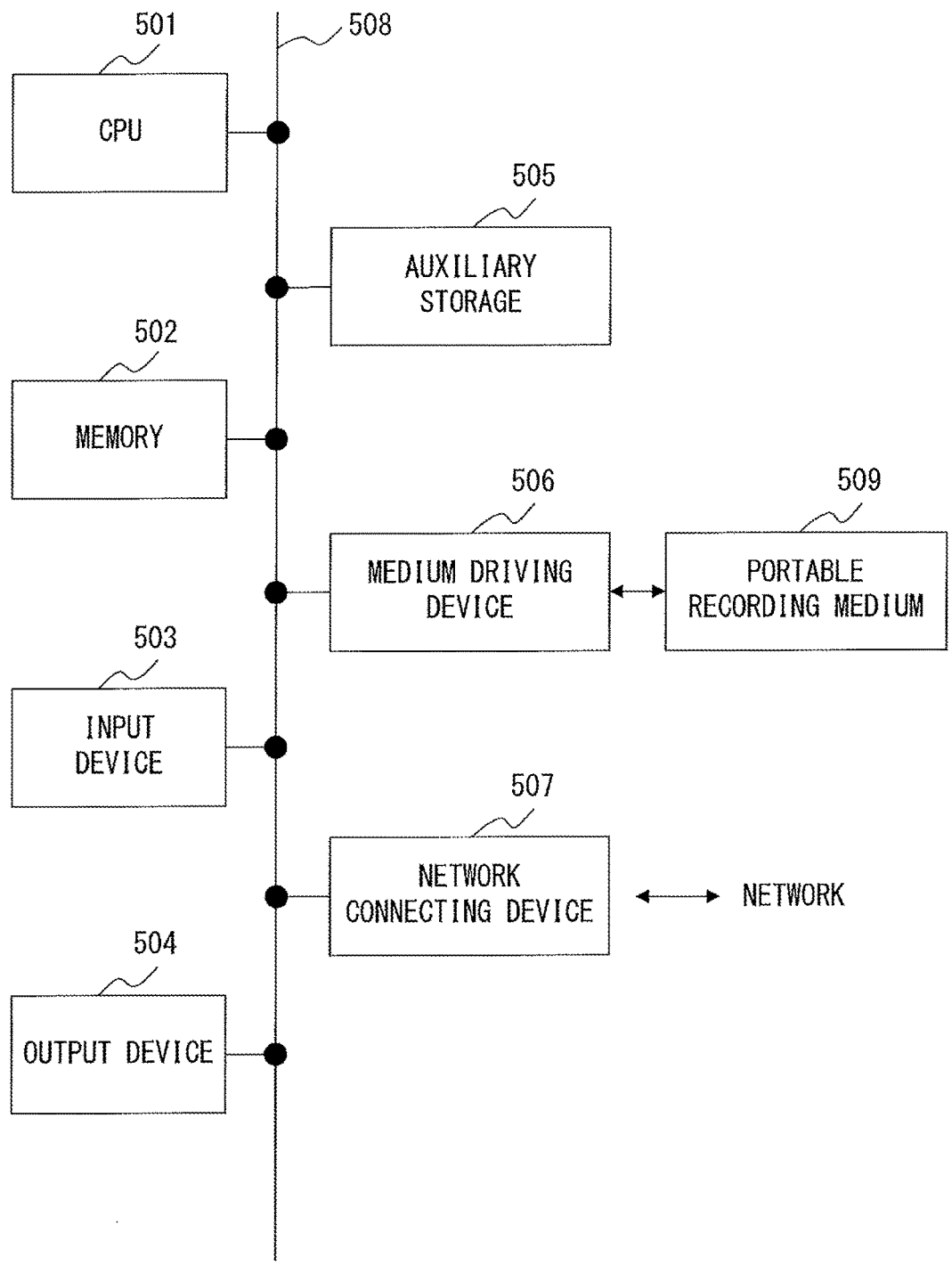
F I G. 5

CRYPTOGRAPHIC PROCESSING DEVICE AND CRYPTOGRAPHIC PROCESSING METHOD

CROSS-REFERENCE TO RELATED APPLICATION

This application is based upon and claims the benefit of priority of the prior Japanese Patent Application No. 2014-254548, filed on Dec. 16, 2014, the entire contents of which are incorporated herein by reference.

FIELD

The embodiments discussed herein relate to a cryptographic processing device and a cryptographic processing method.

BACKGROUND

While regulations to protect personal information and confidential information have recently been tightened, the market of the services that use on such information has been expanding. A service that uses the information on the positions of personal users that can be obtained from their smartphones is an example of such a service.

Thus, securing technologies that permit using of personal information or confidential information that remains protected have been attracting attention. Among the securing technologies, there is a method that uses a cryptographic technology or a statistical technology according to a data type or service requirements.

A homomorphic encryption technology is known as a securing technology that uses a cryptographic technology. The homomorphic encryption technology is one of the public key encryption methods in which a pair of different keys is used for encryption and decryption, and has a function that permits a data operation in a state in which the data remains encrypted. For example, encryption function E of a homomorphic encryption with respect to addition and multiplication have the characteristics as described in the following formulas:

$$E(m1)+E(m2)=E(m1+m2) \quad (1)$$

$$E(m1)*E(m2)=E(m1*m2) \quad (2)$$

Formula (1) indicates that it is homomorphic for addition, and Formula (2) indicates that it is homomorphic for multiplication. As described above, according to the homomorphic encryption technology, when performing, on two or more encrypted texts, an operation that corresponds to an addition or multiplication, an encrypted text for a result of an operation of adding or multiplying the original plain texts can be obtained without decrypting the encrypted texts.

Such characteristics of a homomorphic encryption have been expected to be used in the field of e-voting or e-money, or in the field of cloud computing, in recent years. As a homomorphic encryption with respect to addition or multiplication, the Rivest Shamir Adleman (RSA) encryption that only permits multiplication to be performed and the Additive ElGamal encryption that only permits addition to be performed are known.

Further, a homomorphic encryption that satisfies Formulas (1) and (2) was proposed in 2009 that permits both addition and multiplication to be performed (see, for example, Non Patent Document 1). Non Patent Document 1 only discloses a theoretical method for realizing a homomorphic encryption, and does not disclose a practical constructing method. However, in recent years, a practical constructing method of a somewhat homomorphic encryption has been proposed that permits both addition and multiplication to be performed (see, for example, Non Patent Document 2).

For a secured distance calculation using a homomorphic encryption, a cryptographic processing device that permits a reduction in both a size of encrypted vector data and a time for the secured distance calculation is also known (see, for example, Patent Document 1). This cryptographic processing device obtains a first polynomial from a first vector by use of a first transform polynomial and a second polynomial from a second vector by use of a second transform polynomial. Then, the cryptographic processing device obtains a first weight that relates to a secured distance of the first vector and a second weight that relates to a secured distance of the second vector.

Next, the cryptographic processing device encrypts each of the first polynomial, the second polynomial, the first weight, and the second weight using a homomorphic encryption, so as to obtain a first encrypted polynomial, a second encrypted polynomial, a first encrypted weight, and a second encrypted weight. Then, the cryptographic processing device obtains an encrypted secured distance that corresponds to an encryption of a secured distance between the first vector and the second vector from the first encrypted polynomial, the second encrypted polynomial, the first encrypted weight, and the second encrypted weight.

Patent Document 1: Japanese Laid-open Patent Publication No. 2014-126865

Non Patent Document 1: C. Gentry, "Fully Homomorphic Encryption Using Ideal Lattices", STOC 2009, pp. 169-178, 2009.

Non Patent Document 2: K. Lauter, M. Naehrig and V. Vaikuntanathan, "Can Homomorphic Encryption be Practical?", In ACM workshop on Cloud Computing Security Workshop-CCSW 2011, ACM, pp. 113-124, 2011.

SUMMARY

According to an aspect of the embodiments, a cryptographic processing device includes a memory, a processor, and a transmitter.

The memory stores therein a first vector. The processor generates a first encrypted polynomial by encrypting a first polynomial that corresponds to a first binary vector obtained by performing a binary transformation on elements of the first vector. The transmitter transmits to a cryptographic operation device cryptographic information that represents the first encrypted polynomial.

The cryptographic operation device multiplies the first encrypted polynomial by a second encrypted polynomial that is generated by encrypting a second polynomial that corresponds to a second binary vector obtained by performing a binary transformation on elements of a second vector, so as to generate a third encrypted polynomial. When assigning 2 to a variable in a prescribed portion of a third polynomial obtained by decrypting the third encrypted polynomial, a result of an operation of the first vector and the second vector is obtained.

The object and advantages of the invention will be realized and attained by means of the elements and combinations particularly pointed out in the claims.

It is to be understood that both the foregoing general description and the following detailed description are exemplary and explanatory and are not restrictive of the invention.

BRIEF DESCRIPTION OF DRAWINGS

FIG. 1 is a functional block diagram of a cryptographic processing device;
FIG. 2 is a flowchart of a cryptographic process;
FIG. 5 is a block diagram of an information processing device.

DESCRIPTION OF EMBODIMENTS

Figure 3:
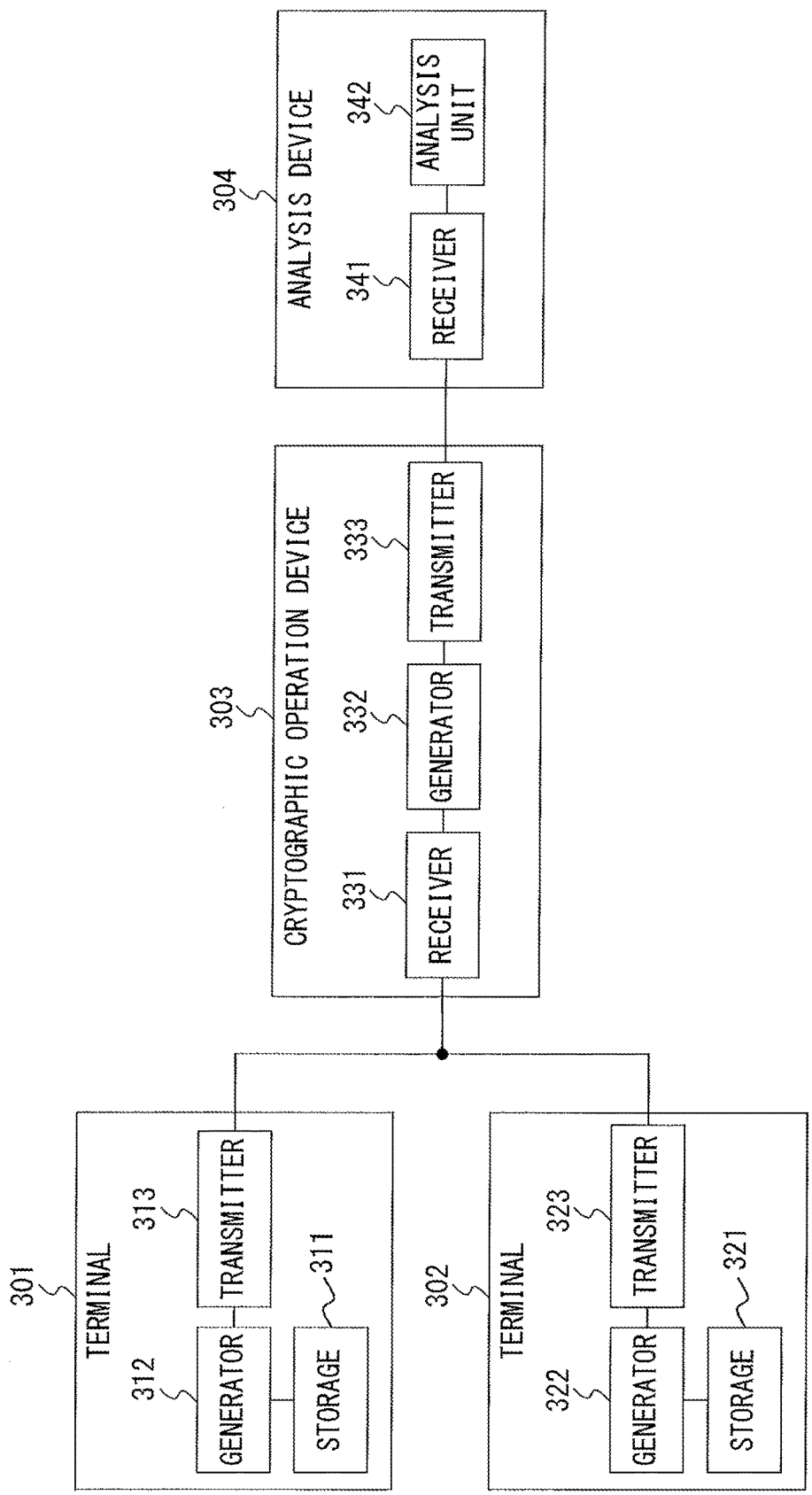
FIG. 3 is a block diagram of a statistical system.

Embodiments of the present invention will now be described in detail with reference to the drawings.

Section 3.2 of Non Patent Document 2 discloses a practical constructing method of a homomorphic encryption. According to this method, three key-generating parameters (n,q,t) are mainly used to generate an encryption key. n is an integer that is a power of two, and is referred to as a lattice dimension. q is a prime, and t is an integer that is less than the prime q.

In the process of the encryption key generation, first, a polynomial sk of degree n−1 in which each coefficient is very small is generated as a secret key at random. The value of each coefficient is restricted by a certain parameter σ. Next, a polynomial a1 of degree n−1 in which each coefficient is less than q and a polynomial e of degree n−1 in which each coefficient is very small are generated at random. Then, the following formula for a polynomial a0 is calculated, and a pair of polynomials (a0,a1) is defined as a public key pk.

$$a0 = -(a1*sk + t*e) \quad (11)$$

However, in a calculation of the polynomial a0, a polynomial whose degree is lower than n is always calculated by using "$x^n = -1, x^{n+1} = -x, \ldots$" with respect to a polynomial whose degree is higher than or equal to n. Further, as a coefficient in each term included in a polynomial, a remainder obtained by dividing the coefficient by a prime q is used. A space in which such a polynomial operation is performed is often technically represented as $R_q := F_q[x]/(x^n+1)$.

Next, for plaintext data m that is represented by a polynomial of degree n−1 in which each coefficient is less than t and a public key pk, three polynomials u, f, and g of degree n−1 in which each coefficient is very small are generated at random, and cryptographic data Enc(m,pk) of the plaintext data m is defined by the following formulas:

$$Enc(m,pk) = (c0, c1) \quad (12)$$

$$c0 = a0*u + t*g + m \quad (13)$$

$$c1 = a1*u + t*f \quad (14)$$

The polynomial operation in the space $R_q$ is also used for a calculation of the polynomial c0 and the polynomial c1. In this case, a cryptographic addition for cryptographic data Enc(m1,pk)=(c0,c1) and cryptographic data Enc(m2,pk)=(d0,d1) is performed by the following formula:

$$Enc(m1,pk) + Enc(m2,pk) = (c0+d0, c1+d1) \quad (15)$$

Further, a cryptographic multiplication for the cryptographic data Enc(m1,pk) and the cryptographic data Enc(m2,pk) is performed by the following formula:

$$Enc(m1,pk)*Enc(m2,pk) = (c0*d0, c0*d1+c1*d0, c1*d1) \quad (16)$$

When performing the cryptographic multiplication by Formula (16), the cryptographic data changes from that of a two-dimensional vector to that of three-dimensional vector. If the cryptographic multiplication is repeated several times, there is a further increase in the elements of the cryptographic data that is a multiplication result.

Next decryption processing is described. The cryptographic data c=(c0, c1, c2, ...) in which the elements have increased as a result of an operation such as a several-times cryptographic multiplication is decrypted by calculating the following formula for a decryption result Dec(c,sk) by use of a secret key sk.

$$Dec(c,sk) = [c0 + c1*sk + c2*sk^2 + \ldots]_q \bmod t \quad (17)$$

In Formula (17), $[f(x)]_q$ mod t represents a polynomial in which each coefficient $z_i$ in a polynomial f(x) is replaced with $[z_i]_q$ mod t. A value of $[z]_q$ for an integer z is defined by the following formula by use of a remainder w obtained by dividing z by q:

$$[z]_q = w \text{ (in case of } w < q/2) \quad (18)$$

$$[z]_q = w - q \text{ (in case of } w \geq q/2) \quad (19)$$

Thus, the range of values of $[z]_q$ is [−q/2,q/2). Further, a mod t represents a remainder obtained by dividing an integer a by t.

Taking (n,q,t)=(4,1033,20) for example, the following polynomial is a simple example of a secret key sk, a public key pk, and cryptographic data Enc(m,pk):

$$sk = \text{Mod}(\text{Mod}(4,1033)*x^3 + \text{Mod}(4,1033)*x^2 + \text{Mod}(1,1033)*x, x^4+1) \quad (20)$$

$$pk = (a0, a1) \quad (21)$$

$$a0 = \text{Mod}(\text{Mod}(885,1033)*x^3 + \text{Mod}(519,1033)*x^2 + \text{Mod}(621,1033)*x + \text{Mod}(327,1033), x^4+1) \quad (22)$$

$$a1 = \text{Mod}(\text{Mod}(661,1033)*x^3 + \text{Mod}(625,1033)*x^2 + \text{Mod}(861,1033)*x + \text{Mod}(311,1033), x^4+1) \quad (23)$$

$$Enc(m, pk) = (c0, c1) \quad (24)$$

$$m = 3 + 2x + 2x^2 + 2x^3 \quad (25)$$

$$c0 = \text{Mod}(\text{Mod}(822,1033)*x^3 + \text{Mod}(1016,1033)*x^2 + \text{Mod}(292,1033)*x + \text{Mod}(243,1033), x^4+1) \quad (26)$$

$$c1 = \text{Mod}(\text{Mod}(840,1033)*x^3 + \text{Mod}(275,1033)*x^2 + \text{Mod}(628,1033)*x + \text{Mod}(911,1033), x^4+1) \quad (27)$$

In Formulas (20) to (27), Mod(a,q) represents a remainder obtained by dividing an integer a by a prime q, and Mod(f(x),$x^4$+1) represents a remainder (polynomial) obtained by dividing a polynomial f(x) by a polynomial $x^4$+1. For example, Mod(f(x),$x^4$+1) for f(x)=$x^4$ is equal to Mod(f(x),$x^4$+1) for f(x)=−1, and Mod(f(x),$x^4$+1) for f(x)=$x^5$ is equal to Mod(f(x),$x^4$+1) for f(x)=−x.

The two pieces of cryptographic data, Enc(f(x),pk) and Enc(g(x),pk), for the two polynomials of a degree not higher than n−1, f(x) and g(x), have characteristics with respect to addition and multiplication as described in the following formulas:

$$\text{Enc}(f(x),pk)+\text{Enc}(g(x),pk)=\text{Enc}(f(x)+g(x),pk) \qquad (31)$$

$$\text{Enc}(f(x),pk)*\text{Enc}(g(x),pk)=\text{Enc}(f(x)*g(x),pk) \qquad (32)$$

Further, a cryptographic processing device of Patent Document 1 permits a great improvement in processing time and a size of cryptographic data by performing a polynomial transformation to represent the vector data as one polynomial and encrypting the polynomial by a homomorphic encryption.

In this cryptographic processing device, for example, the following two d-dimensional vectors are used as input data:

$$A=(a_0, a_2, \ldots a_{n-1}) \qquad (41)$$

$$B=(b_0, b_2, \ldots b_{n-1}) \qquad (42)$$

The following two types of polynomial transformation, for example, an ascending-order transformation and a descending-order transformation, are used to calculate an inner product or a distance of two vectors at a high speed in a state in which those two vectors remain encrypted.

[Ascending-Order Transformation]

$$A=(a_0, a_1, a_2, \ldots, a_{n-1})$$

$$\Rightarrow pm1(A)=\Sigma_{i=0}^{n-1} a_i x^i \qquad (43)$$

[Descending-Order Transformation]

$$B=(b_0, b_1, b_2, \ldots, b_{n-1})$$

$$\Rightarrow pm2(B)=-\Sigma_{i=0}^{n-1} b_i x^{n-i} \qquad (44)$$

A polynomial pm1(A) and a polynomial pm2(B)) are polynomials of a variable x. When encrypting the polynomial pm1(A) and the polynomial pm2(B) by a homomorphic encryption, an encrypted polynomial E(pm1(A)) and an encrypted polynomial E(pm2(B)) are generated.

$$E(pm1(A))=\text{Enc}(pm1(A),pk) \qquad (45)$$

$$E(pm2(B))=\text{Enc}(pm2(B),pk) \qquad (46)$$

When multiplying the encrypted polynomial E(pm1(A)) by the encrypted polynomial E(pm2(B)), a multiplication pm1(A)*pm2(B) is performed in a state in which the polynomials remain encrypted. Then, when decrypting a multiplication result E(pm1(A))*E(pm2(B)), a constant term included in a polynomial that is a decryption result is a value such as the following formula:

$$\Sigma_{i=0}^{n-1} a_i b_i = a_0 b_0 + a_1 b_1 + \ldots + a_{n-1} b_{n-1} \qquad (47)$$

Formula (47) represents an inner product of a vector A and a vector B. According this method, it is possible to calculate the inner product more efficiently than by using the method for encrypting respective elements of the vector A and the vector B and multiplying them. The inner product of the vector A and the vector B represents a correlation between those vectors, so the inner product calculation can be used for a statistical system.

For example, consider that two client terminals hold data DA and data DB, respectively, and a correlation between the data DA and the data DB is to be obtained without disclosing their respective data to each other.

In this case, the two client terminals respectively transform the data DA and the data DB into a vector A and a vector B so as to generate an encrypted polynomial E(pm1(A)) and an encrypted polynomial E(pm2(B)) and transmit them to a cryptographic operation server in a cloud. Next, the cryptographic operation server multiplies the encrypted polynomial E(pm1(A)) by the encrypted polynomial E(pm2(B)) so as to generate a result of the cryptographic multiplication, and transmits it to an analysis server that is a third party. Then, the analysis server decrypts the result of the cryptographic multiplication by use of a secret key so as to obtain an inner product of the vector A and the vector B using a polynomial that is a decryption result, and performs a correlation analysis between the data DA and the data DB on the basis of the inner product.

Using the cryptographic processing device of Patent Document 1 makes it possible to calculate an inner product or a distance of two vectors more efficiently than by using the method for encrypting respective elements of the two vectors and multiplying them. However, the processing performance of a homomorphic encryption will be degraded because the size of the encrypted polynomial generated by a homomorphic encryption is larger if the values of the respective elements of the two vectors are greater.

However, the value of the inner product of Formula (47) will be much larger if the values of each the elements $a_i$ of the vector A and each of the elements $b_i$ of the vector B are greater. For example, when $a_i$ and $b_i$ are a 16-bit value, the inner product is a huge value that is a sum of n 32-bit-values. When the inner product is a huge value, a key-generating parameter t of a homomorphic encryption, too, is set to a huge value so that the inner product is less than t, and the size of the encrypted polynomials in Formulas (13) and (14) are larger, which results in the degradation of the processing performance of a homomorphic encryption.

The above-mentioned problem may occur not only when an inner product or a distance of two vectors is obtained but also when a result of the other operation of the two vectors is obtained.

FIG. 1 is a functional block diagram of an example of a cryptographic processing device according to an embodiment. The cryptographic processing device 101 includes a storage 111, a generator 112, and a transmitter 113.

The storage 111 stores therein a first vector. The generator 112 generates a first encrypted polynomial by use of the first vector, and the transmitter 113 transmits to a cryptographic operation device cryptographic information that represents the first encrypted polynomial.

FIG. 2 is a flowchart of an example of a cryptographic process performed by the cryptographic processing device 101 in FIG. 1. First, the generator 112 encrypts a first polynomial that corresponds to a first binary vector obtained by performing a binary transformation on the elements of the first vector, so as to generate a first encrypted polynomial (Step 201). Then, the transmitter 113 transmits to the cryptographic operation device cryptographic information that represents the first encrypted polynomial (Step 202).

The cryptographic operation device multiplies the first encrypted polynomial by a second encrypted polynomial that is generated by encrypting a second polynomial that corresponds to a second binary vector obtained by performing a binary transformation on the elements of a second vector, so as to generate a third encrypted polynomial. When assigning two to a variable in a prescribed portion of a third polynomial obtained by decrypting the third encrypted polynomial, a result of an operation of the first vector and the second vector is obtained.

Such a cryptographic processing device 101 permits an efficient obtaining of a result of an operation of two vectors using a cryptographic operation by use of encrypted polynomials.

FIG. 3 is a block diagram of an example of a statistical system for which the cryptographic processing device 101 in FIG. 1 is used. The statistical system in FIG. 3 includes a terminal 301, a terminal 302, a cryptographic operation device 303, and an analysis device 304. The cryptographic operation device 303 is connected to the terminal 301, the terminal 302, and the analysis device 304 via a communication network, and is provided on a cloud. Each of the terminal 301 and the terminal 302 corresponds to the cryptographic processing device 101 in FIG. 1.

In this example, the analysis device 304 of an analyst who performs a correlation analysis generates a public key and a secret key of a homomorphic encryption and only makes the information on the public key available to the public. This permits the terminal 301, the terminal 302, and the cryptographic operation device 303 to know the public key. Then, the terminal 301 and the terminal 302 encrypt by the public key the information on vectors which they hold, and only transmit cryptographic information to the cryptographic operation device 303.

The cryptographic operation device 303 performs a cryptographic operation by use of the cryptographic information received from the terminal 301 and the terminal 302, and only transmits a result of the cryptographic operation to the analysis device 304. None of the information on vectors is ever leaked to the cryptographic operation device 303 because all the information on the communication network is encrypted.

The terminal 301 includes a storage 311, a generator 312, and a transmitter 313. The storage 311 stores therein a vector VA that represents data DA. The generator 312 transforms the vector VA into a binary vector UA, so as to generate an encrypted polynomial E(pm1(UA)) by use of the binary vector UA and the public key. The transmitter 313 transmits to the cryptographic operation device 303 cryptographic information that represents the encrypted polynomial E(pm1(UA)).

The terminal 302 includes a storage 321, a generator 322, and a transmitter 323. The storage 321 stores therein a vector VB that represents data DB. The generator 322 transforms the vector VB into a binary vector UB, so as to generate an encrypted polynomial E(pm2(UB)) by use of the binary vector UB and the public key. The transmitter 323 transmits to the cryptographic operation device 303 cryptographic information that represents the encrypted polynomial E(pm2(UB)).

The data DA and the data DB are, for example, text data, image data, or voice/sound data. The text data may be, for example, information on a shopping history that indicates the identification information, the number, and the price of products which a customer purchased in a shop. The image data may be, for example, an image of a subject captured by a camera. The voice/sound data may be, for example, vocalizations of human beings or animals, or a sound of objects.

The terminal 301 and the terminal 302 are able to generate a vector VA and a vector VB, for example, by transforming the feature information extracted from the data DA and the data DB into feature vectors. Further, as cryptographic information that represents an encrypted polynomial, for example, a coefficient included in each term of the encrypted polynomial can be used.

The cryptographic operation device 303 includes a receiver 331, a generator 332, and a transmitter 333. The receiver 331 receives the cryptographic information that represents the encrypted polynomial E(pm1(UA)) from the terminal 301, and the cryptographic information that represents the encrypted polynomial E(pm2(UB)) from the terminal 302. The generator 332 multiplies the encrypted polynomial E(pm1(UA)) by the encrypted polynomial E(pm2(UB)), so as to generate an encrypted polynomial E(pm1(UA))*E(pm2(UB)) for a multiplication result. The transmitter 333 transmits to the analysis device 304 cryptographic information that represents the encrypted polynomial E(pm1(UA))*E(pm2(UB)).

The analysis device 304 includes a receiver 341 and an analysis unit 342. The receiver 341 receives the encrypted polynomial E(pm1(UA))*E(pm2(UB)) from the cryptographic operation device 303. The analysis unit 342 decrypts the encrypted polynomial E(pm1(UA))*E(pm2(UB)) by use of the secret key, so as to generate a polynomial pm1(UA)*pm2(UB), and obtains an inner product of the vector VA and the vector VB by assigning 2 to a variable in a prescribed portion of the generated polynomial. Then, the analysis unit 342 performs, on the basis of the inner product, statistical processing for a correlation analysis between the data DA and the data DB, and outputs a result of the processing.

Next, a specific example of cryptographic processing in the statistical system in FIG. 3 will be described. In this cryptographic processing, for example, the following two k-dimensional vectors are used as a vector VA and a vector VB:

$$VA = (a_0, a_2, \ldots, a_{k-1}) \tag{51}$$

$$VB = (b_0, b_2, \ldots, b_{k-1}) \tag{52}$$

The generator 312 in the terminal 301 and the generator 322 in the terminal 302 transform the respective elements of the vector VA and the vector VB into binary values by a binary transformation like the following formulas:

$$a_i = \sum_{u=0}^{d-1} a_i^{(u)} 2^u \tag{53}$$

$$b_i = \sum_{u=0}^{d-1} b_i^{(u)} 2^u \tag{54}$$

However, it is assumed that d is an integer not less than 2, and that the element $a_i$ and the element $b_i$ are integers less than $2^d$. $a_i^{(u)}$ in Formula (53) and $b_i^{(u)}$ in Formula (54) are binary values that are 0 or 1. The vector VA and the vector VB are transformed into kd-dimensional binary vectors like the following formulas by such a binary transformation:

$$VA \rightarrow (a_0^{(0)}, a_0^{(1)}, \ldots, a_0^{(d-1)}, a_1^{(0)}, a_1^{(1)}, \ldots, a_1^{(d-1)}, \ldots, a_{k-1}^{(0)}, a_{k-1}^{(1)}, \ldots, a_{k-1}^{(d-1)}) \tag{55}$$

$$VB \rightarrow (b_0^{(0)}, b_0^{(1)}, \ldots, b_0^{(d-1)}, b_1^{(0)}, b_1^{(1)}, \ldots, b_1^{(d-1)}, \ldots, b_{k-1}^{(0)}, b_{k-1}^{(1)}, \ldots, b_{k-1}^{(d-1)}) \tag{56}$$

Next, the generator 312 inserts d zeros after the element $a_i^{(d-1)}$ of the binary vector in Formula (55), so as to generate a 2kd-dimensional binary vector UA, and the generator 322 inserts d zeros after the element $b_i^{(d-1)}$ of the binary vector in Formula (56), so as to generate a 2kd-dimensional binary vector UB.

$$UA = (a_0^{(0)}, a_0^{(1)}, \ldots, a_0^{(d-1)}, 0, 0, \ldots, 0, a_1^{(0)}, a_1^{(1)}, \ldots, a_1^{(d-1)}, 0, 0, \ldots, 0, \ldots, a_{k-1}^{(0)}, a_{k-1}^{(1)}, \ldots, a_{k-1}^{(d-1)}, 0, 0, \ldots, 0) \tag{57}$$

$$UB = (b_0^{(0)}, b_0^{(1)}, \ldots, b_0^{(d-1)}, 0, 0, \ldots, 0, b_1^{(0)}, b_1^{(1)}, \ldots, b_1^{(d-1)}, 0, 0, \ldots, 0, \ldots, b_{k-1}^{(0)}, b_{k-1}^{(1)}, \ldots, b_{k-1}^{(d-1)}, 0, 0, \ldots, 0) \tag{58}$$

The binary vector UA and the binary vector UB are used as a vector A in Formula (41) and a vector B in Formula (42), respectively. Next, the generator 312 and the generator 322 generate a polynomial pm1(UA) and a polynomial pm2(UB) by use of the binary vector UA and the binary vector UB, using Formulas (43) and (44).

$$pm1(UA) = \sum_{i=0}^{k-1} A_i(x) x^{2id} \tag{59}$$

$$A_i(x) = \sum_{u=0}^{d-1} a_i^{(u)} x^u \tag{60}$$

$$pm2(UB) = -\sum_{i=0}^{k-1} B_i(x) x^{n-2id} \quad (61)$$

$$B_i(x) = \sum_{u=0}^{d-1} b_i^{(u)} x^u \quad (62)$$

In this case, n=2kd. Formula (60) represents the polynomial Ai(x) in Formula (59), and Formula (62) represents the polynomial Bi(x) in Formula (61). The generator 312 and the generator 322 generate an encrypted polynomial E(pm1(UA)) and an encrypted polynomial E(pm2(UB)) using Formulas (45) and (46).

The generator 332 in the cryptographic operation device 303 multiplies the encrypted polynomial E(pm1(UA)) by the encrypted polynomial E(pm2(UB)). As described in Formulas (31) and (32), in a cryptographic operation by a homomorphic encryption, addition and multiplication for two polynomials f(x) and g (x) have the characteristics described in the following formulas:

$$E(f(x)) + E(g(x)) = E(f(x) + g(x)) \quad (71)$$

$$E(f(x)) * E(g(x)) = E(f(x) * g(x)) \quad (72)$$

Thus, replacing a multiplication of E(pm1(UA)) by E(pm2(UB)) with pm1(UA) by pm2(UB), a cryptographic operation performed by the generator 332 will now be described. The following polynomial is obtained by multiplying pm1(UA) in Formula (59) by pm2(UB) in Formula (61):

$$pm1(UA) * pm2(UB) = \left( \sum_{i=0}^{k-1} A_i(x) x^{2id} \right) * \left( -\sum_{i=0}^{k-1} B_i(x) x^{n-2id} \right) \quad (73)$$
$$= P1(x) + P2(x)$$

$$P1(x) = -\sum_{i=0}^{k-1} A_i(x) B_i(x) x^n = \sum_{i=0}^{k-1} A_i(x) B_i(x) \quad (74)$$

Formula (74) represents the polynomial P1(x) in Formula (73). $x^n = -1$ is used for the calculation of Formula (74). The polynomial P1(x) is a polynomial of degree 2(d−1), and the polynomial P2(x) is a polynomial that includes the terms whose degree is higher than or equal to 2d. The encrypted polynomial E(pm1(UA))*E(pm2(UB)) is equivalent to an encrypted polynomial E(P1(x)+P2(x)).

The analysis unit 342 in the analysis device 304 decrypts the encrypted polynomial E(pm1(UA))*E(pm2(UB)), so as to generate a polynomial P1(x)+P2(x). Then, the analysis unit 342 assigns two to a variable x in P1(x) that is a portion of the obtained polynomial including the terms whose degree is 0 to 2(d−1), so as to calculate the value of P1(2).

$$P1(2) = \sum_{i=0}^{k-1} A_i(2) B_i(2) \quad (75)$$
$$= \sum_{i=0}^{k-1} \left( \sum_{u=0}^{d-1} a_i^{(u)} 2^u \right) \left( \sum_{u=0}^{d-1} b_i^{(u)} 2^u \right)$$
$$= \sum_{i=0}^{k-1} a_i b_i$$

As described in Formula (75), the obtained value of P1(2) represents an inner product of the vector VA and the vector VB. Transforming the vector VA and the vector VB into a binary vector UA such as Formula (57) and a binary vector UB such as Formula (58) results in obtaining a decryption result that includes the polynomial P1(x). Further, assigning x=2 to P1(x) permits obtaining of an inner product of the vector VA and the vector VB.

According to such cryptographic processing, it is sufficient if the value of a key-generating parameter t is set to a value greater than the coefficients of each term included in the polynomial P1(x). In particular, it is understood that it is sufficient if the value of the key-generating parameter t is set with respect to the number of elements k of the vector VA and the vector VB and the maximum number of bits d of each of the elements, so as to satisfy t>kd. On the other hand, when multiplying an encrypted polynomial E(pm1(VA)) by an encrypted polynomial E(pm2(VB)) without a binary transformation of the vector VA and the vector VB, the requirement for the key-generating parameter t is t>m*2^(2d).

For example, when calculating E(pm1(VA))*E(pm2(VB)) setting k=1000 and d=16, the value of t is greater than 1000*2^32. On the other hand, when calculating E(pm1(UA))*E(pm2(UB)) using a binary vector UA and a binary vector UB, it is sufficient if the value of t is greater than 16000. This value of t reaches practical levels for the homomorphic encryption disclosed in Non Patent Document 2.

As described above, generating an encrypted polynomial after a binary transformation of vectors permits using of a batch encryption method similar to that of Patent Document 1 without increasing the size of the encrypted polynomial with respect to vectors including elements with large values. In particular, it becomes possible to more efficiently calculate, using a one-time cryptographic multiplication, an inner product of vectors including elements with large values in a state in which the vectors remain encrypted.

The analysis device 304 can calculate not only an inner product of a vector A and a vector B but also various statistical values based on the inner product. The analysis device 304 may calculate a similarity based on the inner product (such as cosine similarity), or may calculate a dissimilarity based on the inner product (such as a Hamming distance and a Euclidean distance).

Figure 4:
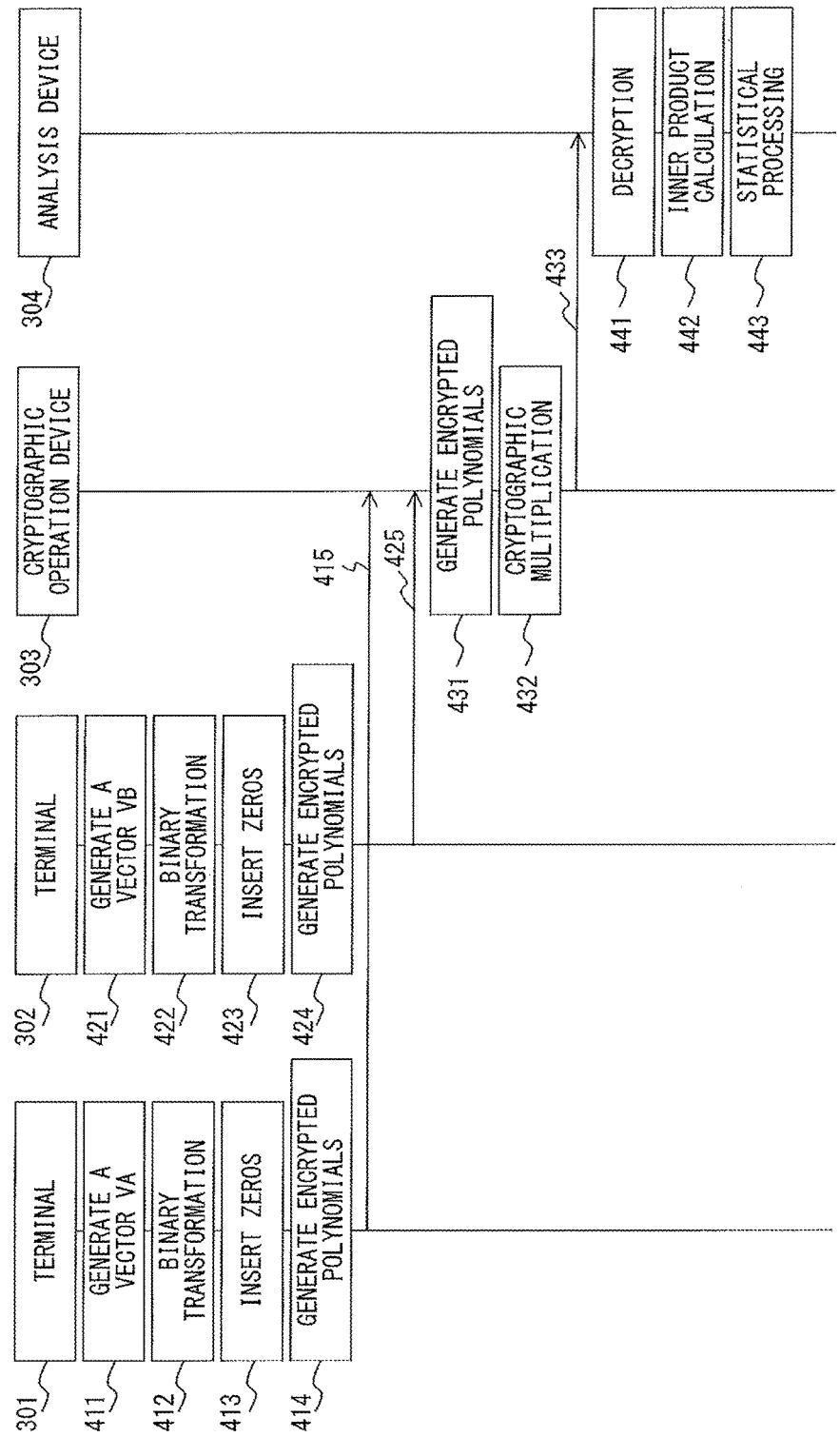
FIG. 4 is a flowchart of a specific example of the cryptographic process.

FIG. 4 is a flowchart of an example of cryptographic processing in the statistical system of FIG. 3. In this cryptographic processing, the analysis device 304 calculates a covariance cov(VA,VB) and a correlation coefficient r(VA,VB) of a vector VA and a vector VB by use of an inner product of the vector VA and the vector VB. The covariance cov(VA,VB) and the correlation coefficient r(VA,VB) are calculated using the following formulas by use of an average $m_{VA}$ and a standard deviation $s_{VA}$ of the elements of the vector VA, and an average $m_{VB}$ and a standard deviation $s_{VB}$ of the elements of the vector VB.

$$m_{VA} = \frac{\sum_{i=0}^{k-1} a_i}{k} \quad (81)$$

$$m_{VB} = \frac{\sum_{i=0}^{k-1} b_i}{k} \quad (82)$$

$$s_{VA} = \sqrt{\frac{1}{k}\left(\sum_{i=0}^{k-1} a_i^2\right) - m_{VA}^2} \quad (83)$$

$$s_{VB} = \sqrt{\frac{1}{k}\left(\sum_{i=0}^{k-1} b_i^2\right) - m_{VB}^2} \quad (84)$$

-continued $$\text{cov}(VA, VB) = \frac{1}{k-1}\left(\sum_{i=0}^{k-1} a_i b_i - k m_{VA} m_{VB}\right) \quad (85)$$

$$r(VA, VB) = \frac{\text{cov}(VA, VB)}{S_{VA} S_{VB}} \quad (86)$$

First, the generator 312 in the terminal 301 generates a vector VA from data DA (Step 411) and performs a binary transformation on each element of the vector VA, so as to generate the binary vector in Formula (55) (Step 412). Next, the generator 312 inserts d zeros after the element $a_i^{(d-1)}$ of the binary vector in Formula (55) so as to generate the binary vector UA in Formula (57) (Step 413).

Next, the generator 312 transforms the binary vector UA into a polynomial pm1(UA) and a polynomial pm2(UA) using Formulas (43) and (44) (Step 414). Then, the generator 312 encrypts the polynomial pm1(UA) and the polynomial pm2(UA) by use of a public key, so as to generate an encrypted polynomial E(pm1(UA)) and an encrypted polynomial E(pm2(UA)). The transmitter 313 transmits to the cryptographic operation device 303, cryptographic information that represents the encrypted polynomial E(pm1(UA)), and cryptographic information that represents the encrypted polynomial E(pm2(UA)) (Step 415).

On the other hand, the generator 322 in the terminal 302 generates a vector VB from data DB (Step 421) and performs a binary transformation on each element of the vector VB, so as to generate the binary vector in Formula (56) (Step 422). Next, the generator 322 inserts d zeros after the element $b_i^{(d-1)}$ of the binary vector in Formula (56), so as to generate the binary vector UB in Formula (58) (Step 423).

Next, the generator 322 transforms the binary vector UB into a polynomial pm1(UB) and a polynomial pm2(UB) using Formulas (43) and (44) (Step 424). Then, the generator 322 encrypts the polynomial pm1(UB) and the polynomial pm2(UB) by use of a public key, so as to generate an encrypted polynomial E(pm1(UB)) and an encrypted polynomial E(pm2(UB)). The transmitter 323 transmits to the cryptographic operation device 303, cryptographic information that represents the encrypted polynomial E(pm1(UB)), and cryptographic information that represents the encrypted polynomial E(pm2(UB)) (Step 425).

First, the generator 332 in the cryptographic operation device 303 performs a binary transformation on a k-dimensional vector VC in which all the elements are 1, as in Formulas (55) and (57), so as to generate a 2kd-dimensional binary vector UC (Step 431).

$$VC = (1, 1, \ldots, 1) \quad (91)$$

$$VC \rightarrow (1, 0, \ldots, 0, 1, 0, \ldots, 0, \ldots, 1, 0, \ldots, 0) \quad (92)$$

$$UC = (1, 0, \ldots, 0, 0, 0, \ldots, 0, 1, 0, \ldots, \\ 0, 0, 0, \ldots, 0, \ldots, 1, 0, \ldots, 0, 0, 0, \ldots, 0) \quad (93)$$

Next, the generator 332 transforms the binary vector UC into a polynomial pm1(UC) and a polynomial pm2(UC) using Formulas (43) and (44). Then, the generator 332 encrypts the polynomial pm1(UC) and the polynomial pm2(UC) by use of a public key, so as to generate an encrypted polynomial E(pm1(UC)) and an encrypted polynomial E(pm2(UC)).

Next, the generator 332 performs the following five types of cryptographic multiplication, so as to generate five multiplication results (Step 432).

(1) The generator 332 multiplies the encrypted polynomial E(pm1(UA)) by the encrypted polynomial E(pm2(UC)), so as to generate an encrypted polynomial E(pm1(UA))*E(pm2(UC)) for a multiplication result.

(2) The generator 332 multiplies the encrypted polynomial E(pm1(UC)) by the encrypted polynomial E(pm2(UB)), so as to generate an encrypted polynomial E(pm1(UC))*E(pm2(UB)) for a multiplication result.

(3) The generator 332 multiplies the encrypted polynomial E(pm1(UA)) by the encrypted polynomial E(pm2(UA)), so as to generate an encrypted polynomial E(pm1(UA))*E(pm2(UA)) for a multiplication result.

(4) The generator 332 multiplies the encrypted polynomial E(pm1(UB)) by the encrypted polynomial E(pm2(UB)), so as to generate an encrypted polynomial E(pm1(UB))*E(pm2(UB)) for a multiplication result.

(5) The generator 332 multiplies the encrypted polynomial E(pm1(UA)) by the encrypted polynomial E(pm2(UB)), so as to generate an encrypted polynomial E(pm1(UA))*E(pm2(UB)) for a multiplication result.

Then, the transmitter 333 transmits to the analysis device 304 cryptographic information that represents each encrypted polynomial for a multiplication result (Step 433).

The analysis unit 342 in the analysis device 304 decrypts the five encrypted polynomials for a multiplication result by use of a secret key, so as to generate five polynomials that are decryption results (Step 441). Next, the analysis unit 342 assigns x=2 to a polynomial of degree 2(d-1) that is a portion of the terms, except for the terms whose degree is higher than 2(d-1), included in each of the polynomials that are decryption results, so as to calculate the following five types of inner product (Step 442).

(a) An inner product of the vector VA and the vector VC.
(b) An inner product of the vector VC and the vector VB.
(c) An inner product of the vector VA and the vector VA.
(d) An inner product of the vector VB and the vector VB.
(e) An inner product of the vector VA and the vector VB.

The inner product of the vector VA and the vector VC represents a sum of the elements of the vector VA that appears on the right side of Formula (81), and the inner product of the vector VC and the vector VB represents a sum of the elements of the vector VB that appears on the right side of Formula (82).

The inner product of the vector VA and the vector VA represents a sum of squares of the elements of the vector VA that appears on the right side of Formula (83), and the inner product of the vector VB and the vector VB represents a sum of squares of the elements of the vector VB that appears on the right side of Formula (84). The inner product of the vector VA and the vector VB appears on the right side of Formula (85), and is calculated by assigning x=2 to the polynomial P1(x) in Formula (74).

The analysis unit 342 performs a statistical analysis by use of five types of inner product and Formulas (81) to (86) to calculate a covariance cov(VA,VB) and a correlation coefficient r(VA,VB) of the vector VA and the vector VB, and outputs a result of the processing (Step 443).

According to such cryptographic processing, it becomes possible to efficiently calculate a covariance and a correlation coefficient by use of five types of cryptographic multiplication without increasing the size of an encrypted polynomial with respect to vectors including elements with large values.

The configurations of the cryptographic processing device 101 in FIG. 1 and the statistical system in FIG. 3 are merely examples, and some of the components may be omitted or changed according to the applications or the requirements of the cryptographic processing device. For example, in the statistical system in FIG. 3, a vector VA and a vector VB may be generated so as to generate E(pm1(UA)), E(pm2(UA)), E(pm1(UB)), and E(pm2(UB)) by use of the terminal 301 or the terminal 302. In this case, the other terminal can be omitted.

The flowcharts illustrated in FIGS. 2 and 4 are merely examples, and some of the processes may be omitted or changed according to the applications or the requirements of the cryptographic processing device or the statistical system. For example, in the cryptographic processing in FIG. 4, when E(pm1(UC)) and E(pm2(UC)) have been generated in advance, the process in Step 431 can be omitted.

At Step 443 in FIG. 4, the analysis device 304 may generate a result of processing based only on an inner product of the vector VA and the vector VB. In this case, the analysis device 304 can omit a calculation of an inner product of the vector VA and the vector VC, an inner product of the vector VC and the vector VB, an inner product of the vector VA and the vector VA, and an inner product of the vector VB and the vector VB at Step 442.

Further, the terminal 301 can omit a generation of E(pm2(UA)) at Step 414, and the terminal 302 can omit a generation of E(pm1(UB)) at Step 424. The cryptographic operation device 303 can omit the process at Step 431, and four cryptographic multiplications except the multiplication of E(pm1(UA)) and E(pm2(UB)) at Step 432.

Formulas (1) to (93) are merely examples, and other formulations may be used. For example, instead of a polynomial of degree 2(d−1) included in the polynomials of Formula (73), a formulation such that an inner product of the vector VA and the vector VB can be obtained from other portions of the polynomials may be used.

The cryptographic processing device 101, the terminal 301, the terminal 302, the cryptographic operation device 303, and the analysis device 304 in FIGS. 1 and 3 can be implemented, for example, as a hardware circuit. In this case, each component in the cryptographic processing device 101 may be implemented as an individual circuit or a plurality of components may be implemented as an integrated circuit.

The cryptographic processing device 101, the terminal 301, the terminal 302, the cryptographic operation device 303, and the analysis device 304 can also be realized by using an information processing device (computer) as illustrated in FIG. 5.

The information processing device in FIG. 5 includes a central processing unit (CPU) 501, a memory 502, an input device 503, an output device 504, an auxiliary storage 505, a medium driving device 506, and a network connecting device 507. These components are connected to one another via a bus 508.

The memory 502 is, for example, a semiconductor memory such as a read only memory (ROM), a random access memory (RAM), and a flash memory. The memory 502 stores therein a program and data used for processing performed by the cryptographic processing device 101, the terminal 301, the terminal 302, the cryptographic operation device 303, or the analysis device 304. The memory 502 can be used as the storage 111 in FIG. 1, or the storage 311 or the storage 321 in FIG. 3.

When the information processing device is the cryptographic processing device 101, the CPU 501 (processor) operates as the generator 112 to perform a cryptographic process by executing the program by use of the memory 502.

When the information processing device is the terminal 301, the CPU 501 operates as the generator 312 to perform a cryptographic process by executing the program by use of the memory 502. When the information processing device is the terminal 302, the CPU 501 operates as the generator 322 to perform a cryptographic process by executing the program by use of the memory 502.

When the information processing device is the cryptographic operation device 303, the CPU 501 operates as the generator 332 by executing the program by use of the memory 502. When the information processing device is the analysis device 304, the CPU 501 operates as the analysis unit 342 by executing the program by use of the memory 502.

The input device 503 is, for example, a keyboard or a pointing device, and is used for inputting instructions or information from a user or an operator. The output device 504 is, for example, a display, a printer, or a speaker, and is used for outputting inquiries to the user or the operator, or a result of processing. The result of processing may be a result of the statistical processing performed by the analysis device 304.

The auxiliary storage 505 is, for example, a magnetic disk device, an optical disk device, a magneto-optical disk device, or a tape device. The auxiliary storage 505 may be a hard disk drive or a flash memory. The information processing device stores the program and the data in the auxiliary storage 505 so as to load them into the memory 502 and use them. The auxiliary storage 505 can be used as the storage 111 in FIG. 1, or the storage 311 or the storage 321 in FIG. 3.

The medium driving device 506 drives a portable recording medium 509 so as to access the recorded content. The portable recording medium 509 is, for example, a memory device, a flexible disk, an optical disc, or a magneto-optical disk. The portable recording medium 509 may be, for example, a compact disk read only memory (CD-ROM), a digital versatile disk (DVD), or a universal serial bus (USB) memory. The user or the operator can store the program and the data in the portable recording medium 509 so as to load them into the memory 502 and use them.

As described above, a computer-readable recording medium that stores therein a program and data is a physical (non-transitory) recording medium such as the memory 502, the auxiliary storage 505, and the portable storage medium 509.

The network connecting device 507 is a communication interface that is connected to a communication network such as a local area network (LAN) or the Internet and makes a data conversion associated with communication. The information processing device can receive the program and the data from an external device via the network connecting device 507 so as to load them into the memory 502 and use them. The network connecting device 507 can be used as the transmitter 113 in FIG. 1, or the transmitter 313, the transmitter 323, the receiver 331, the transmitter 333, or the receiver 341 in FIG. 3.

The information processing device does not necessarily include all the components in FIG. 5, and some of the components can be omitted according to the applications or the requirements. For example, when the instructions or the information from the user or the operator are not to be input, the input device 503 may be omitted, and when the inquiries to the user or the operator or the result of processing is not to be output, the output device 504 may be omitted. When the information processing device does not access the portable recording medium 509, the medium driving device 506 may be omitted.

All examples and conditional language provided herein are intended for the pedagogical purposes of aiding the reader in understanding the invention and the concepts contributed by the inventor to further the art, and are not to be construed as limitations to such specifically recited examples and conditions, nor does the organization of such examples in the specification relate to a showing of the superiority and inferiority of the invention. Although one or more embodiments of the present invention have been described in detail, it should be understood that the various changes, substitutions, and alterations could be made hereto without departing from the spirit and scope of the invention.

What is claimed is:

1. A cryptographic processing device comprising:
    a memory that stores therein a first vector;
    a processor that generates a first encrypted polynomial by encrypting a first polynomial that corresponds to a first binary vector obtained by performing a binary transformation on elements of the first vector; and
    a transmitter that transmits cryptographic information that represents the first encrypted polynomial to a cryptographic operation device that multiplies the first encrypted polynomial by a second encrypted polynomial to generate a third encrypted polynomial,
    wherein the processor or another cryptographic processing device generates the second encrypted polynomial by encrypting a second polynomial that corresponds to a second binary vector obtained by performing a binary transformation on elements of a second vector, and
    wherein an analysis device obtains a result of an operation of the first vector and the second vector by assigning 2 to a variable in a prescribed portion of a third polynomial obtained by decrypting the third encrypted polynomial.

2. The cryptographic processing device according to claim 1, wherein
    the processor generates the first binary vector by transforming each of the elements of the first vector into a bit string including a plurality of bits and by inserting a bit string including a plurality of bit values that represent a plurality of zeros between two bit strings that correspond to two of the elements of the first vector.

3. The cryptographic processing device according to claim 2, wherein
    the number of bits in the bit string including the plurality of bit values that represent the plurality of zeros is equal to the number of bits d in the bit string including the plurality of bits, the prescribed portion of the third polynomial corresponds to terms that are included in the third polynomial and whose degree is not higher than $2(d-1)$, and the result of the operation is an inner product of the first vector and the second vector.

4. A cryptographic processing method comprising:
    generating a first encrypted polynomial by encrypting, by a cryptographic processing device, a first polynomial that corresponds to a first binary vector obtained by performing a binary transformation on elements of a first vector; and
    transmitting, by the cryptographic processing device, cryptographic information that represents the first encrypted polynomial to a cryptographic operation device that multiplies the first encrypted polynomial by a second encrypted polynomial to generate a third encrypted polynomial,
    wherein the cryptographic processing device or another cryptographic processing device generates the second encrypted polynomial by encrypting a second polynomial that corresponds to a second binary vector obtained by performing a binary transformation on elements of a second vector, and
    wherein an analysis device obtains a result of an operation of the first vector and the second vector by assigning 2 to a variable in a prescribed portion of a third polynomial obtained by decrypting the third encrypted polynomial.

5. The cryptographic processing method according to claim 4, wherein
    the generating the first encrypted polynomial generates the first binary vector by transforming each of the elements of the first vector into a bit string including a plurality of bits and by inserting a bit string including a plurality of bit values that represent a plurality of zeros between two bit strings that correspond to two of the elements of the first vector.

6. The cryptographic processing method according to claim 5, wherein
    the number of bits in the bit string including the bit value that represents the plurality of zeros is equal to the number of bits d in the bit string including the plurality of bits, the prescribed portion of the third polynomial corresponds to terms that are included in the third polynomial and whose degree is not higher than $2(d-1)$, and the result of the operation is an inner product of the first vector and the second vector.

7. A non-transitory computer-readable recording medium having stored therein a cryptographic processing program for causing a computer to execute a cryptographic process comprising:
    generating a first encrypted polynomial by encrypting a first polynomial that corresponds to a first binary vector obtained by performing a binary transformation on elements of a first vector; and
    transmitting cryptographic information that represents the first encrypted polynomial to a cryptographic operation device that multiplies the first encrypted polynomial by a second encrypted polynomial to generate a third encrypted polynomial,
    wherein the computer or a cryptographic processing device generates the second encrypted polynomial by encrypting a second polynomial that corresponds to a second binary vector obtained by performing a binary transformation on elements of a second vector, and
    wherein an analysis device obtains a result of an operation of the first vector and the second vector by assigning 2 to a variable in a prescribed portion of a third polynomial obtained by decrypting the third encrypted polynomial.

8. The non-transitory computer-readable recording medium according to claim 7, wherein
    the generating the first encrypted polynomial generates the first binary vector by transforming each of the elements of the first vector into a bit string including a plurality of bits and by inserting a bit string including a plurality of bit values that represent a plurality of zeros between two bit strings that correspond to two of the elements of the first vector.

9. The non-transitory computer-readable recording medium according to claim 8, wherein the number of bits in the bit string including the bit value that represents the plurality of zeros is equal to the number of bits d in the bit string including the plurality of bits, the prescribed portion of the third polynomial corresponds to terms that are included in the third polynomial and whose degree is not higher than 2(d-1), and the result of the operation is an inner product of the first vector and the second vector.

* * * * *